United States Patent Office 3,523,783
Patented Aug. 11, 1970

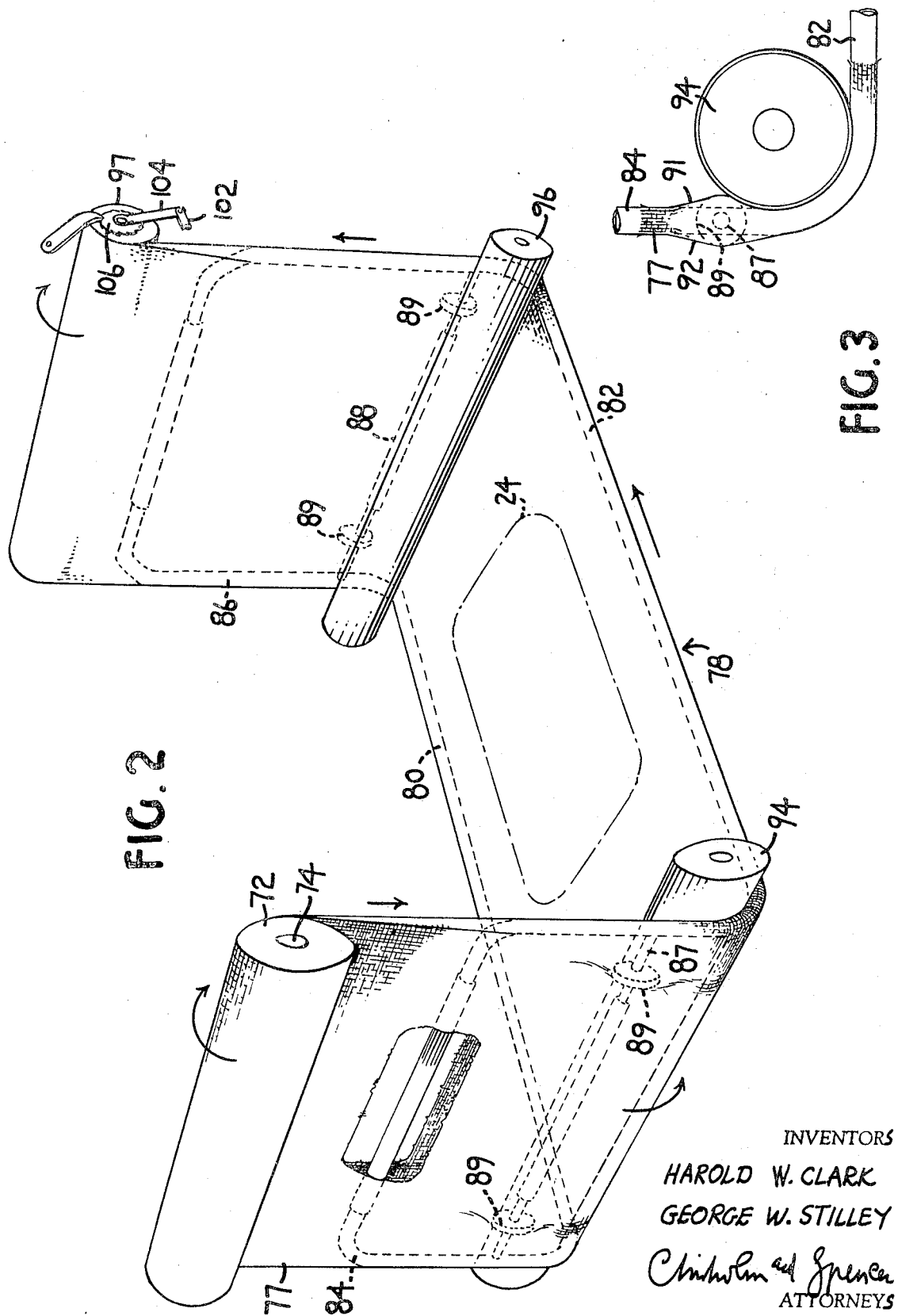

3,523,783
GLASS PRESS SHAPING MEANS WITH
MOVABLE FABRIC COVER
Harold W. Clark, Pittsburgh, and George W. Stilley, Freeport, Pa., assignors to PPG Industries, Inc., Pittsburgh, Pa., a corporation of Delaware
Filed Aug. 21, 1967, Ser. No. 661,912
Int. Cl. C03b 23/02
U.S. Cl. 65—287
7 Claims

ABSTRACT OF THE DISCLOSURE

Apparatus for holding movable fiber glass fabric covers for press bending molds in unwrinkled condition.

---

Figure 1:
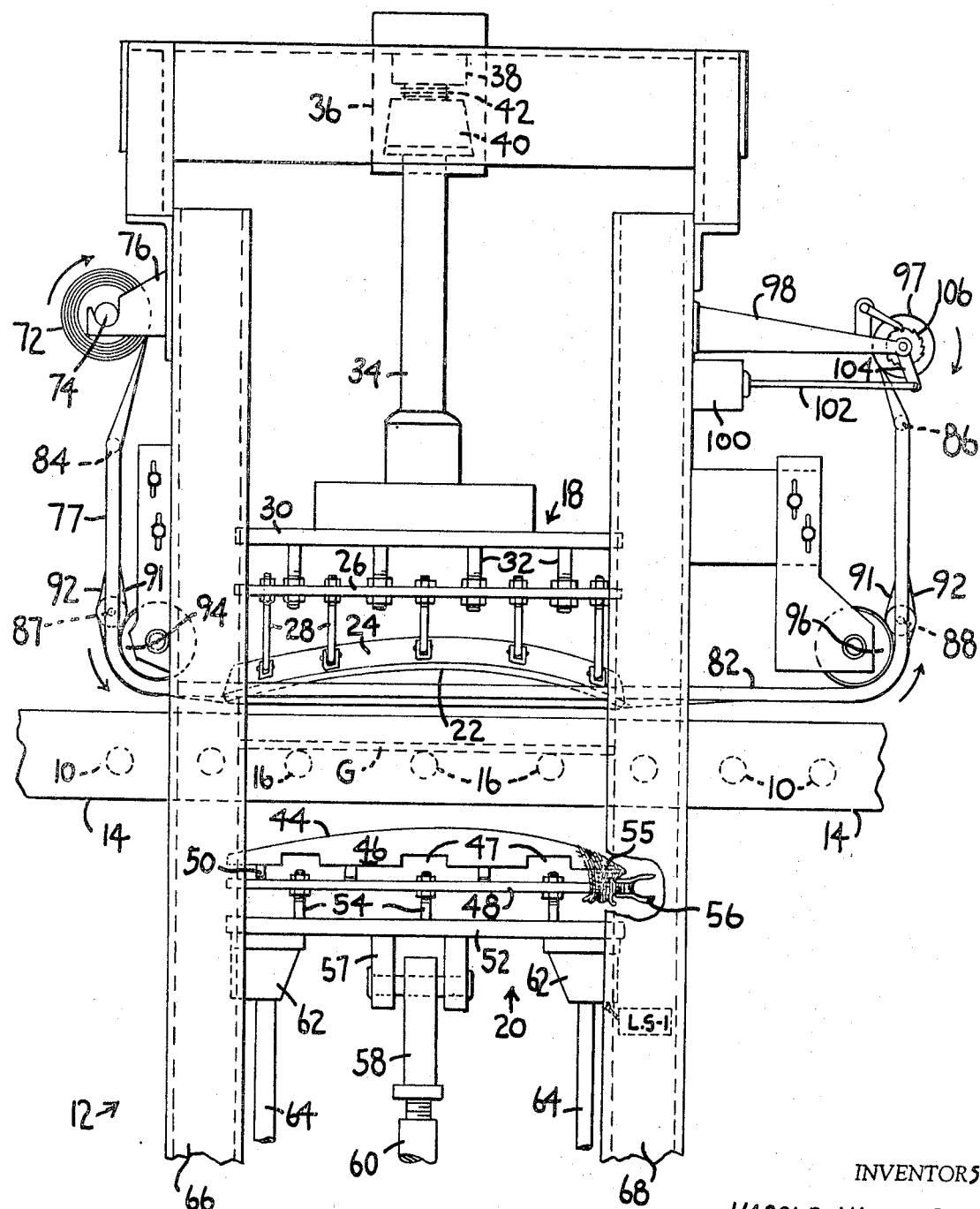

This invention relates to shaping glass sheets and, in particular, relates to apparatus for maintaining a movable cover in unwrinkled condition over a press bending mold for shaping glass sheets and is especially important in preventing wrinkling of a cover for a mold having a shaping face of concave configuration or of an anticlastic compound curvature including a concave configuration about one axis of curvature.

The art of shaping glass sheets by press bending involves heating a succession of glass sheets to an elevated temperature sufficient for deformation in an enclosed furnace and then removing the hottest sheet from the furnace and sandwiching the heated sheet between a pair of shaping molds having shaping faces of complementary curvature that conform to the shape desired for the bent glass while the heated glass remains above its deformation temperature. The press bent sheet is then chilled rapidly if it is desired to temper the sheet.

Press bending molds are usually made of materials that are harmful to either the glass or the shaping face of the molds whenever there is direct contact between the hot glass and the mold during press bending. Consequently, the glass bending art has developed fiber glass covers for such molds. Covers of knit fiber glass cloth composed of textured yarns as described and claimed in U.S. Patent No. 3,148,968 to James H. Cypher and Clement E. Valchar are preferred because molds with such covers produce bent glass sheets having better optical properties than molds covered with woven cloth covers.

Such covers are subject to wear and therefore have to be replaced quite frequently. The delay in operations caused by the necessity for cover replacement has resulted in several suggestions for mounting a cover material between a supply reel and a receiving reel and periodically moving the cover by winding the receiving reel, thus delaying the need for replacing the cover material. U.S. Patent No. 3,329,494 to Frank J. Carson and George F. Ritter, Jr. discloses such a winding and reeling device for renewing a cover for a shaping mold having a convex shaping face. A pair of idler rolls cooperate with the convex shaping face to maintain the cover material in unwrinkled condition. However, such apparatus would be totally unsuitable to prevent a cover from wrinkling when the cover is disposed over a concave shaping face.

The present invention provides means for supporting fiber glass cover material in an unwrinkled condition across the shaping face of a press bending mold and is not limited in its use to molds of convex configuration only, but holds the cover against wrinkling even though the shaping face it covers has a concave configuration about one or two axes of curvature.

Superior covers for press bending molds are now produced on a circular knitting machine. The resulting cover material is a loosely knit fiber glass cloth composed of textured yarn in the form of an open ended tube or cylinder or sleeve. The sleeve is flattened to form a ribbon composed of a double layer of fabric folded lengthwise at its ends. The double layer ribbon is wound about a supply reel and shipped for use as a roll mounted on the supply reel.

In order to function as an unwrinkled cover when used with press bending molds having shaping faces of any configuration desired, the present invention provides in combination with a rotatable supply reel mounted for rotation adjacent one side of a press bending mold and a rotatable receiving reel mounted for rotation adjacent the other side of the mold and oriented substantially parallel to said first reel and a roll of fiber glass fabric in the form of a double layer of fabric extending in a direction transverse to the axes of said reels from the supply reel to the receiving reel across the length of the curved shaping face of the press bending mold with its leading end wound about the receiving reel and its trailing end wound about the supply reel, the improvement comprising means which maintains the roll in unwrinkled condition over the full length and width of the shaping face.

In an illustrative embodiment of the present invention, the improvement comprises a pair of elongated, spaced members extending lengthwise the entire length of the shaping face on opposite sides thereof for engaging the inner walls of said hollow sleeve to maintain said sleeve in unwrinkled condition across the width of the shaping face and having smooth surfaces to permit said hollow sleeve to be displaced periodically across the length of the shaping face, a pair of freely rotatable rolls located beyond both the leading edge and trailing edge of said shaping face and rotatable about axes substantially parallel to the axes of rotation for said reel in position to engage the opposite faces of one of said layers of said sleeve to maintain said sleeve in unwrinkled condition across the length of the shaping face and means to support said spaced members and said pairs of freely rotatable rolls in said relation to the shaping face of the press bending mold. In a particular embodiment of the invention, the elongated, spaced members are interconnected at their ends by connecting end members to form an open frame. Each connecting end member supports a rod that supports a freely rotating roll of relatively small diameter that separates the layers of the sleeve and also rests in free rotating relation over another freely rotatable roll of relatively large diameter. The elongated, spaced members hold the cover against wrinkling in the direction of the width of the mold shaping face while the pairs of rolls support the cover in a non-wrinkled relation across the length of the shaping face of the mold.

The present invention will be understood much better in the light of a detailed description of an illustrative embodiment of the invention which follows.

In the drawings which form part of the description and wherein like reference numbers refer to like structural elements, FIG. 1 is an elevation view of a press bending apparatus incorporating the present invention, with parts omitted for clarity, FIG. 2 is a schematic oblique view of the illustrative embodiment of a device that maintains a movable fiber glass cloth cover in unwrinkled condition over the full length and width of a shaping face, only the outline of which is shown in phantom; and FIG. 3 is an enlarged detail view of certain structural elements of the illustrative embodiment.

Referring first to FIG. 1, a horizontal press bending station is shown. A conveyor comprising a series of spaced continuous rolls 10 extends from a furnace (not shown) to a press bending station 12 and from the latter to a chilling station (not shown). The conveyor rolls 10 are supported on bearing housings (not shown) carried by horizontal beams 14. At the press bending station 12, there are a series of stub rolls 16 that extend inward a limited distance only in axial alignment with an opposing series of stub rolls.

The conveyor supports a series of glass sheets G for movement through said furnace and into the press bending station 12, where the sheets are received on the stub rolls 16. Movement of a glass sheet G is stopped when it reaches a position in the press bending station 12 in alignment between an upper press bending mold 18 and a lower press bending mold 20.

The upper mold 18 has a downwardly facing shaping face 22 formed on the lower major surface of a relatively flexible plate 24 of continuous extent. Plate 24 is attached to a rigid reinforcing member 26 by spaced connectors 28. Member 26 is rigidly connected to a rear plate 30 by additional spaced connectors 32. A rod 34 extends upward from its attachment to rear plate 30 and terminates in a housing 36 supported on a support frame for the press bending station 12.

An abutment 38 is carried within the housing 36 to limit the upward movement of an enlarged head 40 at the top portion of rod 34. A spring 42 is entrained around rod 34 between the abutment 38 and the head 40 to cushion the shock when the upper press bending mold 18 is forced upward.

The lower convex press bending mold 20 has an upward facing shaping face 44 formed on the upper surface of a relatively flexible shaping plate 46. Plate 46 is provided with notches 47, one aligned with each stub roll 16, and is connected to a relatively rigid reinforcing member 48 through spaced connectors 50. A rear plate 52 is rigidly connected to the reinforcing member 48 through additional spaced connectors 54. A cover 55 of stretchable, knit fiber glass is secured in unwrinkled condition over the convex shaping face 44 by hand clamps 56 that grip the periphery of the cover to the periphery of the relatively rigid member 48.

A bracket 57 extends downward for engagement by an apertured connecting rod 58 connected to the upper end of a piston rod 60. The latter is actuated for movement between an upper glass engaging position and a lower recessed position (depicted in FIG. 1) by a piston (not shown) in a manner well known in the art to move the lower press bending mold 20 upward and lift the glass sheet G off the stub rolls 16 and into pressurized engagement between the upper mold 18 and the lower mold. When the sheet is shaped, the lower mold 20 retracts to redeposit the bent sheet on the conveyor. The latter transfers the bent sheet to a chilling station and the shaping sation 12 is ready to receive the next glass sheet for press bending.

Additional brackets 62 are supported on the lower mold 20 for vertical movement with vertical guide rods 64 to insure that the lower press bending mold 20 is properly aligned for vertical movement.

The spaced connectors 28 and 50 enable an operator to adjust the local shape of the relatively flexible continuous plates 24 and 46 as described and claimed in British patent specification 1,073,038 of the Pittsburgh Plate Glass Company.

The notches 47 in the lower shaping plate 46 provide clearance therefor for movement through the stub rolls 16 to enable the lower press bending mold to rise above the plane of support for the glass sheet provided by the upper surfaces of the rolls 10 and 16 of the conveyor as described in Belgian Pat. No. 672,514 to the Pittsburgh Plate Glass Company.

The frame supporting the press bending station 12 comprises a pair of vertical columns 66 and another pair of vertical columns 68. Only the front column of each pair of vertical columns 66 and 68 is shown. A limit switch LS–1 is supported on one of the vertical columns 68 for engagement by one of the additional brackets 62 for reasons to be explained later.

The provision of the clamps 56 holds the cover 55 in unwrinkled condition over the convex shaping face 44 of the lower press bending mold 20. Therefore, the cover 55 experiences a relatively slow rate of wear compared to that experienced in a fixedly mounted cover for the upper press bending mold 18. Furthermore, the clamps 56 for securing the cover 55 are easy to operate and the cover 55 for the convex mold 20 can be replaced very rapidly. However, a cover for the concave mold 18 requires frequent replacement and, therefore, the present invention is most concerned with eliminating this source of "down-time" for frequent cover replacement.

The cover for the upper press bending mold 18 according to the present invention comprises a roll 72 of knit fiber glass fabric mounted on a supply reel rigidly fixed to a rod 74. The latter is supported in freely rotatable relation between a pair of grooved brackets 76, only one of which is shown.

As stated previously, the cover is in the form of an open, hollow sleeve 77 that has been folded to provide a double layer of ribbon extending from the supply reel. An open, angular frame 78 (FIG. 2) comprising a pair of elongated spaced members 80 and 82 extending lengthwise of shaping face 22 on opposite sides of the plate 24 is provided for engaging the inner walls of the hollow sleeve 77 to maintain the sleeve or cover in unwrinkled condition across the width of the shaping face 22. Elongated, spaced members 80 and 82 are turned upward at their ends to form connecting end members 84 and 86 of inverted U-shape in elevation. The connecting end members 84 and 86 have sufficient rigidity to support the elongated, spaced members 80 and 82 in spaced relation parallel to one another. The elongated members extend in the direction of the length of the upper mold 18.

Both the elongated members 80 and 82 and the connecting end members 84 and 86 have smooth surfaces to permit the inner surfaces of the hollow sleeve to slide therealong whenever the sleeve 77 is moved along the length of the press face 22. The connecting end members 84 and 86 maintain the elongated members 80 and 82 in sufficiently spaced relation that the latter hold the sleeve in unwrinkled condition across the width of the mold shaping face 22.

Each of the connecting end members 84 and 86 are interconnected by a rod 87 and 88, respectively. A pair of small diameter discs 89 is mounted to each rod 87 and 88 for free rotation thereabout. Each disc 89 serves as a free running roll of relatively small diameter. These discs 89 separate the inner ply 91 of the hollow sleeve 77 from the outer ply 92 of the hollow sleeve 77 and also serve another purpose to be described below.

Vertical columns 66 support a freely rotatable roll 94 therebetween downward and inward of rod 87, while vertical columns 68 support another freely rotatable roll 96 therebetween downwardly and inwardly of rod 88 in such positions that the small diameter discs or free running rolls 89 are supported on the upper and outer peripheral portions of rolls 94 and 96. In addition, rolls 89 engage the inner surface of the inner ply 91 of the hollow sleeve 77 that faces ply 92 while the rolls 94 and 96 engage the surface of inner ply 91 that is adapted to face the shaping face 22 when it extends across the upper mold 18.

The discs 89 and the rolls 94 and 96 are all freely rotatable about axes parallel to the axis of rotation for the rod 74 of the supply reel on which the roll 72 of cover material is mounted. Rolls 94 and 96 and rods 87 and 88 are all located in planes outside the leading and trailing edges of the upper press bending mold 18. Rolls 94 and 96 thus support the open angular frame 78 by providing rolling support for the small diameter rolls or discs 89.

The illustrative embodiment of the present invention also includes a receiving reel 97 mounted between a pair of brackets 98, only the front bracket being shown in FIG. 1, a piston housing 100 with a piston rod 102 extending outward therefrom to a pivotal connection to a ratchet actuating arm 104. The latter is fixed to a ratchet gear arrangement 106 permitting receiving reel 97 to rotate an amount controlled by the distance between gear teeth engaged by the ratchet whenever limit switch LS-1 is actuated by a bracket 62 when the lower press bending mold 20 is moved into its retracted position.

Thus, the cover formed by the hollow sleeve 77 is prevented from wrinkling by being extended across the width of the press face 22 between the elongated members 80 and 82 and is restrained from wrinkling in the opposite direction by being extended across the length of the press face 22 between the line of engagement formed between roll 94 and discs 89 mounted on rod 87 behind the rear end of the press face and the line of engagement formed between roll 96 and the discs 89 mounted on rod 88 beyond the forward end of the press face.

The cover formed by sleeve 77 is moved when the lower press bending mold 20 is disengaged from the glass. The upper press bending mold 18 is limited in its downward movement because enlarged head 40 is unable to drop below the floor of housing 36. Thus, the cover 77 is moved across the concave shaping face 22 when the upper mold 18 does not engage the glass.

The fact that the cover is of a stretchable knit fiber glass cloth enables it to conform to the contour of the shaping face 44 of the lower mold 20 when the latter rises above the plane of the stub rolls 16 to shape a heat-softened glass sheet against the upper mold 18. In effect, the cover 77 moves freely from the supply reel 72 to the receiving reel 97 because the spaced, elongated members have smooth surfaces that have virtually no friction for the sleeve and rolls 94 and 96 and the discs 89 (which are the mechanical equivalents of additional rolls) are all freely rotatable to permit the cover material to move freely across the concave face of the upper mold 18.

A particular embodiment of the present invention has been described for purposes of illustration rather than limitation and many equivalent structures within the concept of the present invention will be obvious in the light of the present disclosure. For example, the principles of the present invention may be employed in a so called vertical or oblique press bending operation wherein the glass is supported in a vertical or oblique plane as well as in the illustrated embodiment wherein the glass is supported in a horizontal plane for press bending. Reference to the scope of the present invention may be obtained from from a study of the claimed subject matter that follows.

What is claimed is:

1. Apparatus for covering a press bending mold for shaping heat-softened glass sheets comprising:
   (1) a rotatable supply reel mounted for rotation about an axis adjacent one side of said mold,
   (2) a rotatable receiving reel mounted for rotation about another axis adjacent the other side of said mold and oriented substantially parallel to said supply reel,
   (3) a roll of fiber glass fabric in the form of a hollow sleeve folded to provide a double layer of fabric extending in a direction transverse to said axes from said supply reel to said receiving reel across the length of a curved shaping face of said press bending mold with its leading end wound onto said receiving reel and its trailing end wound about said supply reel, and
   (4) means disposed within said hollow sleeve to maintain said roll in unwrinkled condition over the full length and width of said shaping face, said means comprising
      (a) a pair of elongated, spaced members extending lengthwise the entire length of said shaping face on opposite sides thereof for engaging the inner walls of said hollow sleeve to maintain said sleeve in unwrinkled condition across the width of said shaping face and having smooth surfaces to permit said hollow sleeve to be displaced periodically across the length of said shaping face and
      (b) a pair of freely rotatable rolls located beyond both the leading edge and trailing edge of said shaping face and rotatable about axes substantially parallel to said prior mentioned axes in position to engage the opposite faces of one of said layers of said sleeve to maintain said sleeve in unwrinkled condition across the length of said shaping face,
      (c) and means to support said spaced members and said pairs of freely rotatable rolls in said relation to said shaping face of said mold.

2. Apparatus as in claim 1, wherein said press bending mold has its said shaping face of a contour and configuration conforming to the contour and configuration desired for bent glass sheets and further including:
   (1) a second press bending mold having a shaping face whose contour and configuration is complementary to that of said first mentioned press bending mold,
   (2) means to provide relative movement between said first and second press bending molds between a glass engaging position and a retracted position, and
   (3) means responsive to movement of one of said molds to actuate movement of said receiving reel to move said sleeve across said shaping face a predetermined distance when said molds are retracted from said glass engaging position.

3. Apparatus as in claim 1, wherein said shaping face is concave about at least one axis of curvature.

4. Apparatus as in claim 1, wherein said sleeve is composed of a stretchable, knit fiber glass fabric.

5. Apparatus as in claim 4, wherein said fabric is composed of textured yarn.

6. Apparatus as in claim 1, wherein each said pair of freely rotatable rolls comprises a roll of relatively large diameter and another roll having fixed thereto a pair of axially spaced discs of relatively small diameter.

7. Apparatus as in claim 1, wherein said elongated spaced members are interconnected at their ends by connecting end members extending rearward beyond the leading and trailing edges of the shaping mold to form an open frame with said elongated spaced members, each connecting end member supporting a free running roll of relatively small diameter which is one of said pair of freely rotatable rolls, said other freely rotatable roll of said pair of rolls being located in position to support said free running roll of relatively small diameter with an inner layer of said sleeve disposed therebetween.

References Cited

UNITED STATES PATENTS 3,148,968    9/1964    Cypher et al.      65—275
3,329,494    7/1967    Carson et al.      65—287

ARTHUR D. KELLOGG, Primary Examiner

U.S. Cl. X.R.

65—106, 275

PO-1050
(5/69)

UNITED STATES PATENT OFFICE
CERTIFICATE OF CORRECTION

Patent No. 3,523,783                    Dated August 11, 1970

Inventor(s) Harold W. Clark and George W. Stilley

It is certified that error appears in the above-identified patent and that said Letters Patent are hereby corrected as shown below:

Column 1, line 6, "Delaware" should read
--Pennsylvania--

SIGNED AND
SEALED
NOV 17 1970

NOV. 17, 1970

(SEAL)
Attest:

Edward M. Fletcher, Jr.
Attesting Officer

WILLIAM E. SCHUYLER, JR.
Commissioner of Patents